(12) United States Patent
Choi et al.

(10) Patent No.: US 9,124,785 B2
(45) Date of Patent: Sep. 1, 2015

(54) METHOD FOR RECEIVING LOW-RESOLUTION AND HIGH-RESOLUTION IMAGES AND DEVICE THEREFOR

(75) Inventors: Wonsik Choi, Seoul (KR); Minsup Kim, Seoul (KR); Donghyun Kwon, Gwangmyeong-si (KR); Donghoon Lee, Gwangmyeong-si (KR); Taeik Kang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 61 days.

(21) Appl. No.: 13/236,114

(22) Filed: Sep. 19, 2011

(65) Prior Publication Data

US 2012/0172086 A1 Jul. 5, 2012

(30) Foreign Application Priority Data

Dec. 29, 2010 (KR) ........................ 10-2010-0137615

(51) Int. Cl.
*H04N 1/21* (2006.01)
*H04N 1/00* (2006.01)
*H04N 5/232* (2006.01)

(52) U.S. Cl.
CPC ........... *H04N 1/2104* (2013.01); *H04N 1/0044* (2013.01); *H04N 1/00442* (2013.01); *H04N 5/23245* (2013.01); *H04N 1/2145* (2013.01)

(58) Field of Classification Search
USPC .................... 348/345, 333.05, 220.1, 333.01; 345/173–178
See application file for complete search history.

(56) References Cited

U.S. PATENT DOCUMENTS

| | | | |
|---|---|---|---|
| 2004/0044670 A1* | 3/2004 | Cazier | 707/100 |
| 2005/0157198 A1 | 7/2005 | Larner et al. | |
| 2006/0203099 A1* | 9/2006 | Omata | 348/220.1 |
| 2006/0221223 A1* | 10/2006 | Terada | 348/333.05 |
| 2007/0064116 A1* | 3/2007 | Muraki | 348/220.1 |
| 2007/0189386 A1* | 8/2007 | Imagawa et al. | 375/240.12 |
| 2007/0270182 A1* | 11/2007 | Gulliksson et al. | 455/556.1 |
| 2009/0021594 A1* | 1/2009 | Tsuda et al. | 348/222.1 |
| 2009/0180003 A1* | 7/2009 | Cho | 348/231.2 |
| 2009/0225186 A1* | 9/2009 | Kurokawa | 348/222.1 |
| 2010/0062803 A1* | 3/2010 | Yun et al. | 455/556.1 |
| 2010/0321530 A1 | 12/2010 | Baek | |
| 2011/0063327 A1* | 3/2011 | Shimizu | 345/660 |
| 2011/0267530 A1* | 11/2011 | Chun | 348/333.11 |

FOREIGN PATENT DOCUMENTS

| | | | | |
|---|---|---|---|---|
| CN | 101102412 A | | 1/2008 | |
| JP | 2004228892 A | * | 8/2004 | ............. H04N 5/232 |

* cited by examiner

*Primary Examiner* — Roberto Velez
*Assistant Examiner* — Quan Pham
(74) *Attorney, Agent, or Firm* — Birch, Stewart, Kolasch & Birch, LLP

(57) ABSTRACT

The method includes receiving an image of a subject via a lens of a camera, generating low-resolution images and high-resolution images repeatedly from the camera in response to a focus adjustment command inputted at a first timing point, displaying the low-resolution images as a preview image of the subject on a display, and storing at least one of the generated high-resolution images to be stored as a photo file of the subject in a memory in response to a photograph-taking command inputted at a second timing point behind the first timing point.

17 Claims, 15 Drawing Sheets

(7-1)

(7-2) (7-3)

FIG. 5
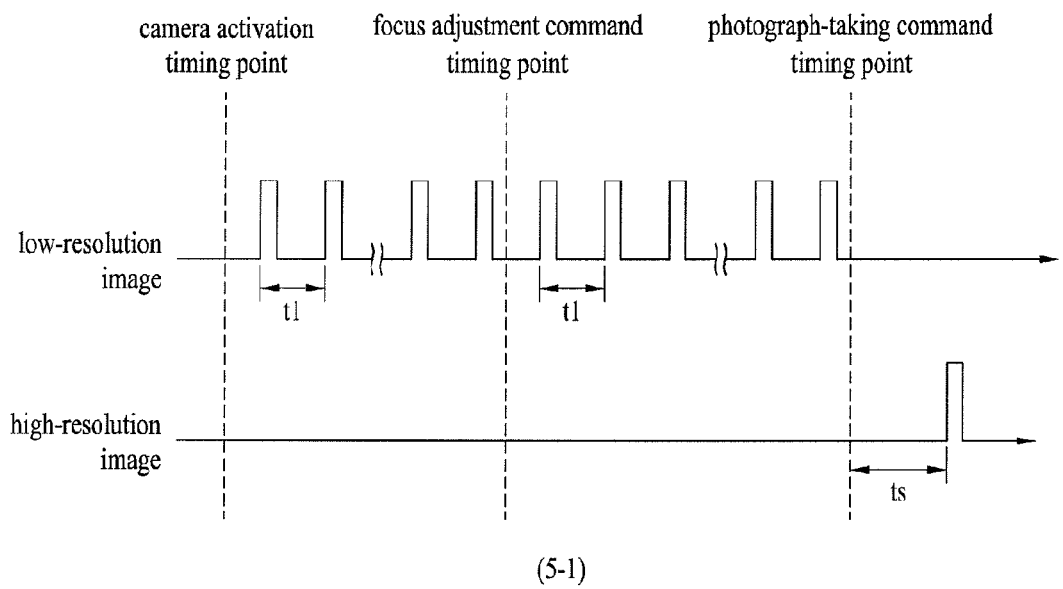
(5-1)
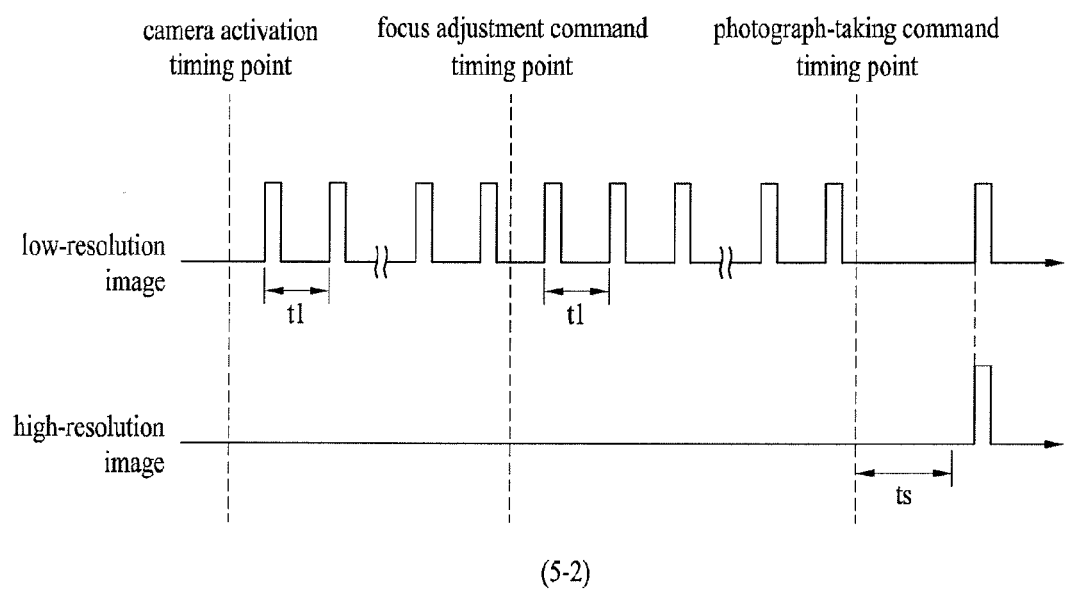
(5-2)

FIG. 7
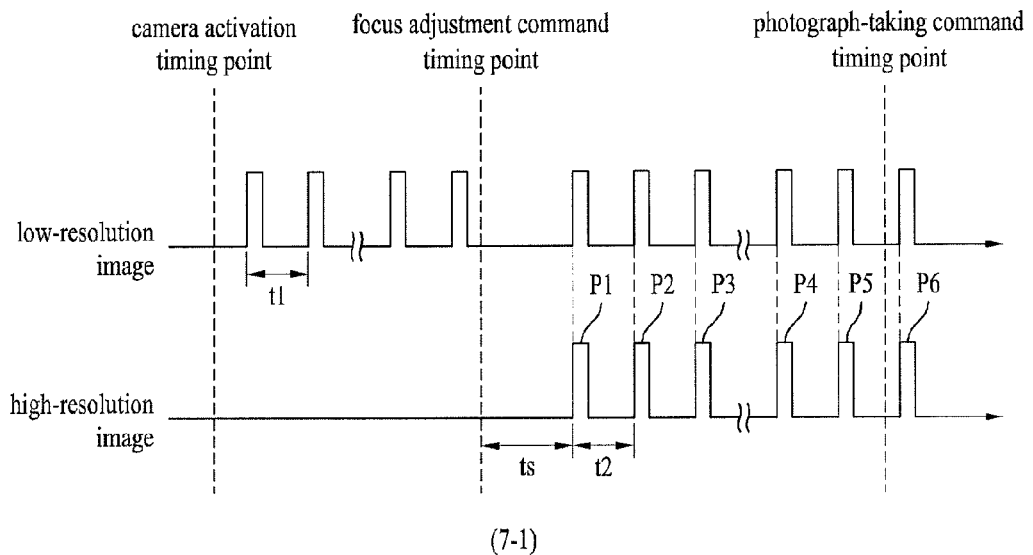
(7-1)
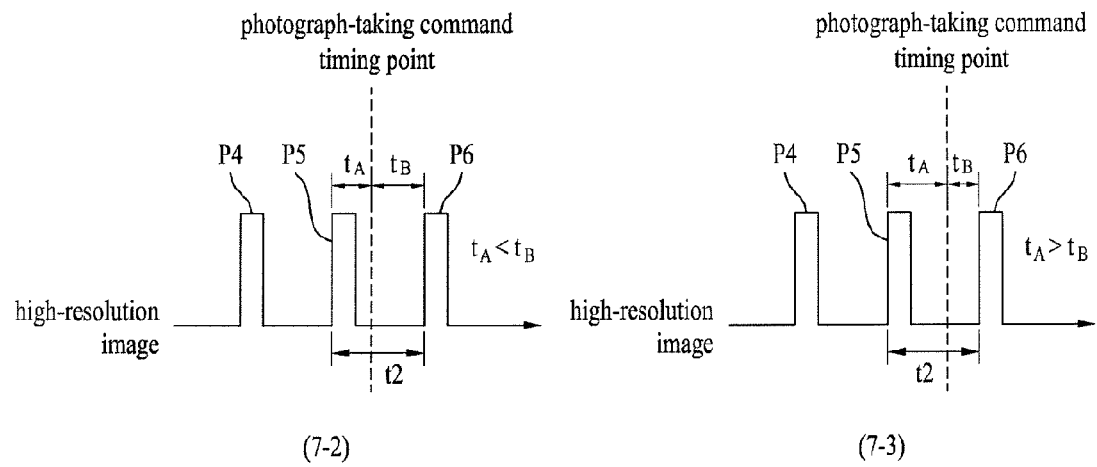
(7-2)            (7-3)

FIG. 11
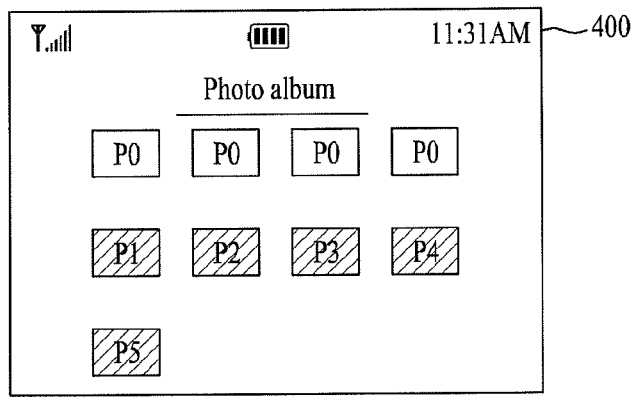
(11-1)
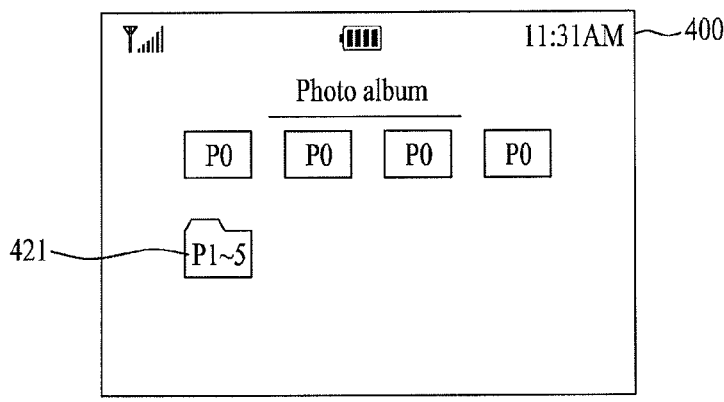
(11-2)
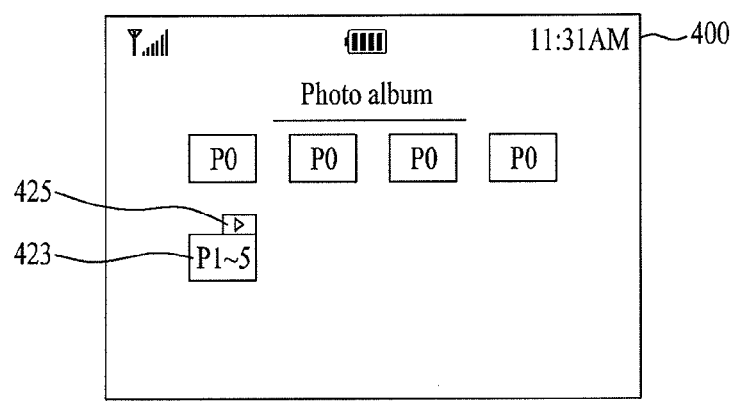
(11-3)

FIG. 12
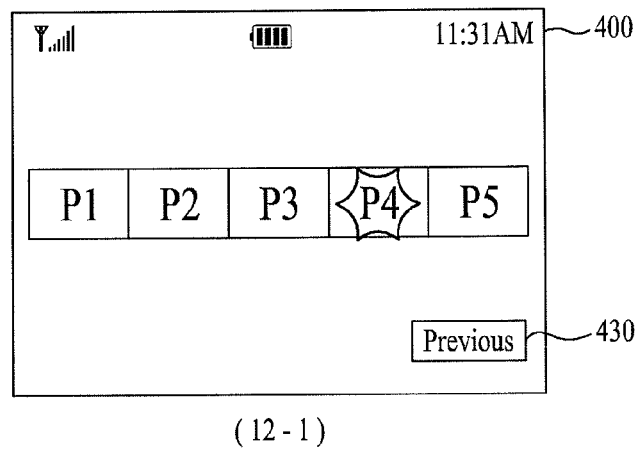
(12-1)
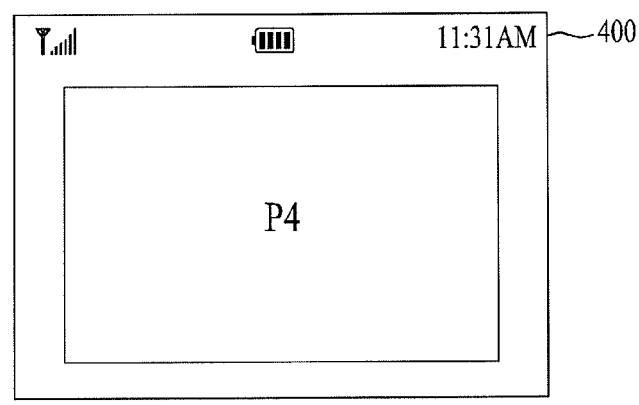
(12-2)

FIG. 13
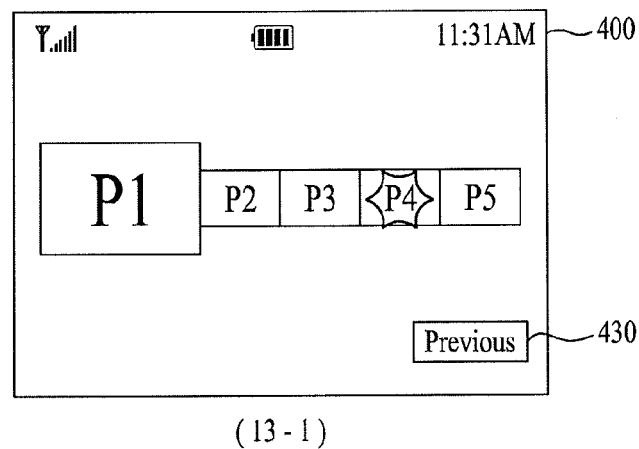
(13-1)
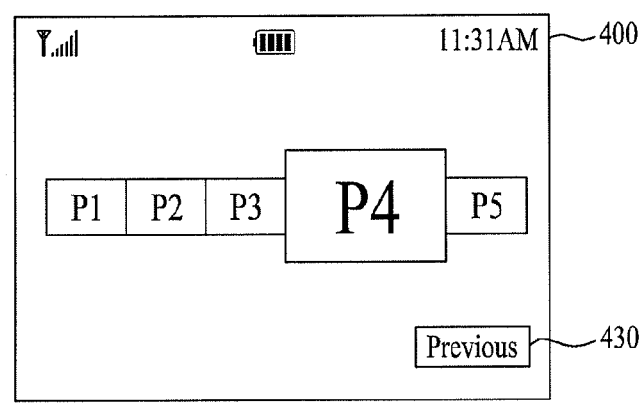
(13-2)

METHOD FOR RECEIVING LOW-RESOLUTION AND HIGH-RESOLUTION IMAGES AND DEVICE THEREFOR

Pursuant to 35 U.S.C. §119(a), this application claims the benefit of earlier filing date and right of priority to Korean Application No.10-2010-0137615, filed on Dec. 29, 2010, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Due to the limited performance of a mobile terminal, a time difference (or a time delay) between a photograph command input timing point (e.g., a shutter press timing point) and an actually photograph-taking timing point can be generated during a photograph-taking. Therefore, the time difference may cause a considerable inconvenience in photographing an image of a subject at a timing point desired by a terminal user. Specifically, when the subject is moving fast, the time difference may worsen the inconvenience.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a terminal user is facilitated to photograph an image of a subject at a desired timing point despite a limited performance of the mobile terminal in a manner of minimizing a time difference between a photograph command input timing point and an actually photograph-taking timing point.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a memory unit, a display unit, a camera unit configured to receive an image of a subject via a lens and generate a low-resolution image and a high-resolution image for the subject, a user input unit configured to input a focus adjustment command and a photograph-taking command, and a controller configured to receive the low-resolution images and the high-resolution images repeatedly from the camera unit in response to the focus adjustment command inputted at a first timing point to display the low-resolution images as a preview image for the subject on the display unit, and store at least one of the repeatedly received high-resolution images as a photo file for the subject in the memory unit in response to the photograph-taking command inputted at a second timing point behind the first timing point.

In another aspect of the present invention, a method of controlling a mobile terminal according to the present invention includes receiving an image of a subject via a lens of a camera unit, generating low-resolution images and high-resolution images repeatedly from the camera unit in response to a focus adjustment command inputted at a first timing point, displaying the low-resolution images as a preview image for the subject on a display unit, and storing at least one of the generated high-resolution images as a photo file for the subject in a memory unit in response to a photograph-taking command inputted at a second timing point behind the first timing point.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 5 is a diagram of low-resolution and high-resolution image graphs for implementing a method of controlling a mobile terminal according to an embodiment of the present invention;

FIG. 7 is a diagram of low-resolution and high-resolution image graphs for implementing a method of controlling a mobile terminal according to an embodiment of the present invention;

FIGS. 9 to 15 are diagrams of display screen configurations for implementing a method of controlling a mobile terminal according to an embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
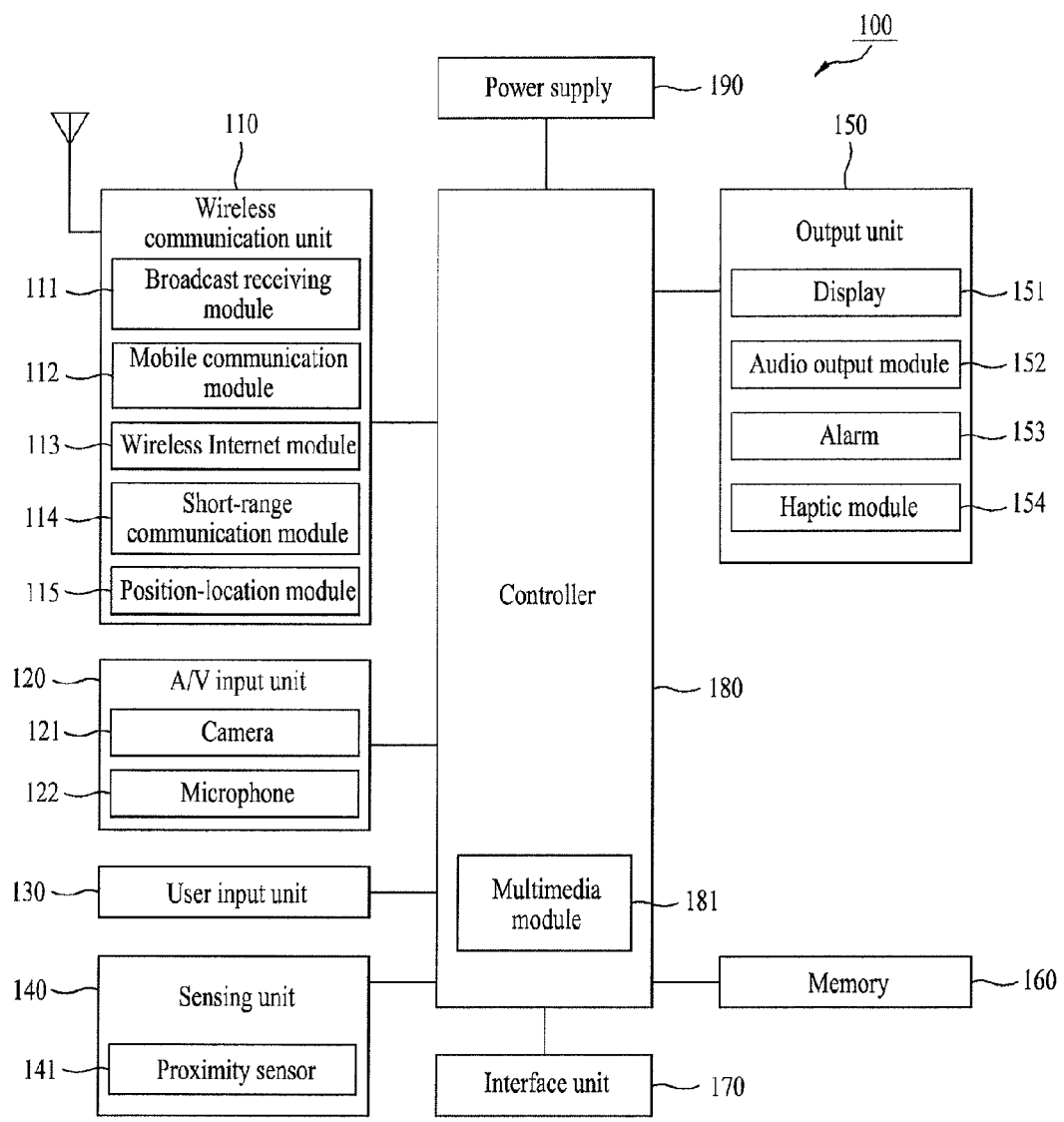
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an AN (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which pen nits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), and WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc. The user input unit 130 is ale to include a shutter unit configured to take a photo. In particular, the shutter unit can be configured to enable a shutter half-pressing for a focus adjustment and the like and a shutter full-pressing for a photograph taking.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm 153 is output a signal for announcing the occurrence of a particular event associated with the mobile terminal 100. Typical events include a call received event, a message received event and a touch input received event. The alarm 153 is able to output a signal for announcing the event occurrence by way of vibration as well as video or audio signal. The video or audio signal can be outputted via the display 151 or the audio output module 152. Hence, the display 151 or the audio output module 152 can be regarded as a part of the alarm 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
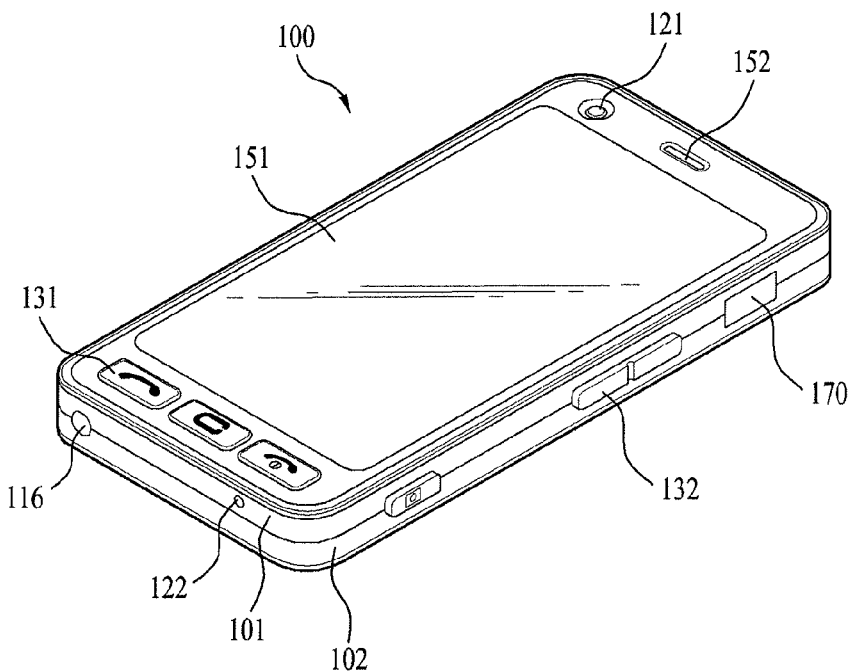
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output module 152, a camera 121, manipulating units 131 and 132 (corresponding to user input unit 130, see FIG. 1), a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The user input unit 130 is able to receive a command for controlling an operation of the terminal 100. And, the user input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output module 152, a command for a switching to a touch recognizing mode of the display 151 or the like can be inputted to the second manipulating unit 132.

Figure 2B:
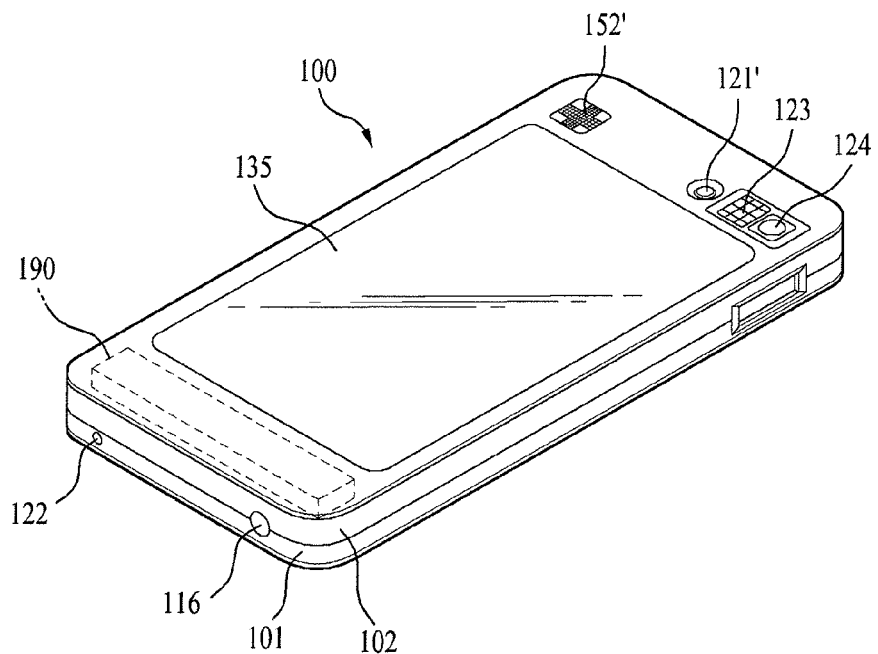
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the minor 124 enables the user to view user's face reflected by the mirror 124.

An additional audio output module 152' can be provided to the backside of the terminal body. The additional audio output module 152' is able to implement a stereo function together with the former audio output module 152 shown in FIG. 2A and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, the camera unit is explained in detail with reference to FIG. 3.

Figure 3:
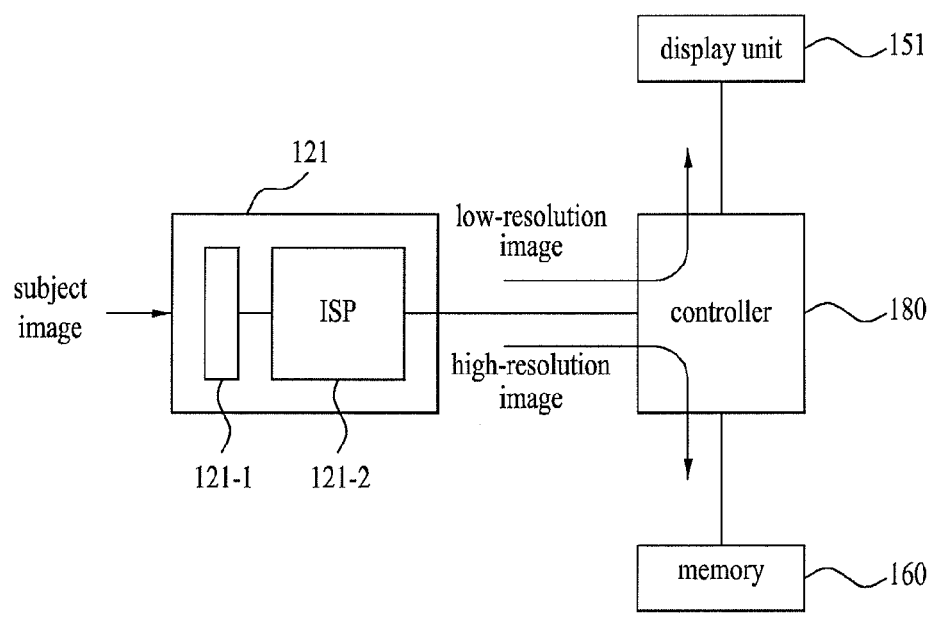
FIG. 3 is a block diagram of a camera unit provided to a mobile terminal according to the present invention.

Referring to FIG. 3, the camera unit 121 can mainly include a lens module 121-1 and an image signal processor (ISP) 121-2. In particular, the image signal processor 121-2 can be independently configured as a separate component or can be included in the controller 180.

The lens module 121-1 receives an input of an image of a subject and is then able to transmit the inputted image to the image signal processor 121-2.

The image signal processor 121-2 is able to generate a low-resolution image and a high-resolution image separately or simultaneously by processing the image of the subject.

The controller 180 is able to control the display unit 151 to display the low-resolution image as a preview image for the subject image. And, the controller 180 is able to control the high-resolution image to be stored as a photo file of the subject image in the memory unit 160.

For example, the low-resolution image can include one of YUV format image, Y'UV format image, YCbBr format image, YPbPr format image and the like. The low-resolution image can have such a resolution as VGA (video graphics array) (640×480), QVGA (quarter VGA) (320×240) and the like.

YUV is a color space typically used as part of a color image pipeline. It encodes a color image or video taking human perception into account, allowing reduced bandwidth for chrominance components, thereby typically enabling transmission errors or compression artifacts to be more efficiently masked by the human perception than using a "direct" RUB-representation. Other color spaces have similar properties, and the main reason to implement or investigate properties of Y'UV would be for interfacing with analog or digital television or photographic equipment that conforms to certain Y'UV standards.

Historically, the terms YUV and Y'UV were used for a specific analog encoding of color information in television systems, while YCbCr was used for digital encoding of color information suited for video and still-image compression and transmission such as MPEG and JPEG. Today, the term YUV is commonly used in the computer industry to describe file-formats that are encoded using YCbCr. The Y'UV model defines a color space in terms of one luma (Y') and two chrominance (UV) components. The Y'UV color model is used in the P The YPbPr color model used in analog component video and its digital version YCbCr used in digital video are more or less derived from it, and are sometimes called Y'UV. ($C_B/P_B$ and $C_R/P_R$ are deviations from grey on blue-yellow and red-cyan axes, whereas U and V are blue-luminance and red-luminance differences.) Previous black-and-white systems used only luma (Y') information. Color information (U and V) was added separately via a sub-carrier so that a black-and-white receiver would still be able to receive and display a color picture transmission in the receiver's native black-and-white format. Y' stands for the luma component (the brightness) and U and V are the chrominance (color) components; luminance is denoted by Y and luma by Y'—the prime symbols (') denote gamma compression, with "luminance" meaning perceptual (color science) brightness, while "luma" is electronic (voltage of display) brightness. The YPbPr color model used in analog component video and its digital version YPbCr used in digital video are more or less derived from it, and are sometimes called Y'UV. ($C_B/P_B$ and $C_R/P_R$ are deviations from grey on blue-yellow and red-cyan axes, whereas U and V are blue-luminance and red-luminance differences.)

As a representative example of the high-resolution image, there is JPEG (joint photographic experts group) format image or the like. In this case, the high-resolution image can have resolution around SXGA (super extended graphics array) (1280×1024) or higher, And, it is enough for the resolution of the low-resolution image to meet a level lower than the resolution of the high-resolution image.

In the following description, how to use the low-resolution image and/or the high-resolution image for a photograph-taking is explained in detail with reference to FIG. 4 and FIG. 5.

Figure 4:
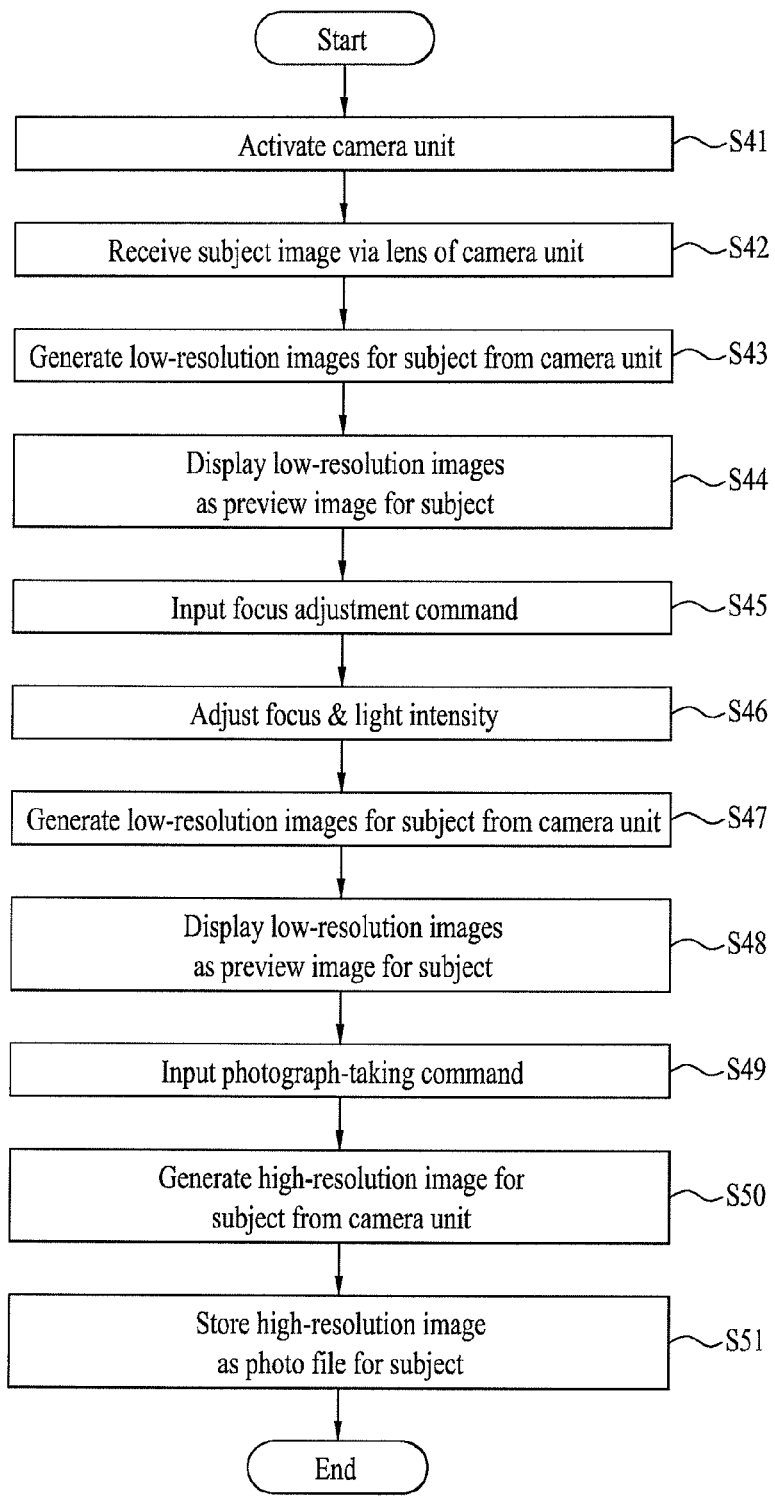
FIG. 4 is a flowchart for a method of controlling a mobile terminal according to an embodiment of the present invention.

FIG. 4 is a flowchart for a method of controlling a mobile terminal according to an embodiment of the present invention. And, FIG. 5 is a diagram of low-resolution and high-resolution image graphs for implementing a method of controlling a mobile terminal according to an embodiment of the present invention. The methods of FIGS. 4-5 may be performed by the devices of FIGS. 1-3.

Referring to FIG. 4 and FIG. 5, the camera unit 121 can be activated for a photograph-taking in the mobile terminal 100 (S41). The activation of the camera unit 121 can be executed by running a menu or an application for the photograph-taking in the mobile terminal 100.

The activated camera unit 121 is able to initiate a light-receiving for the photograph-taking via the lens module 121-1 (S42). That is, the camera unit 121 is able to receive an image of a desired subject via the lens module 121-1.

If so, the controller 180 is able to control the image signal processor 121-2 of the camera unit 121 to generate corresponding low-resolution images using the image of the subject (S43). The camera unit 121 is able to repeatedly generate the low-resolution images of the subject in a first cycle (t1) (e.g., 33 ms) (FIG. 5 (5-1)).

And, the controller 180 is able to control the display unit 151 to display the generated low-resolution images as preview images for the photograph-taking of the subject [S44].

Thereafter, a user is able to input a focus adjustment command (S45). In this case, the focus adjustment command can be inputted in a manner that the user performs a shutter half-pressing on the shutter unit. If the display unit 151 includes a touchscreen, the user is able to input the focus adjustment command in a manner of performing a touch gesture predefined for the focus adjustment on the touchscreen. In this case, the touch gesture can include such an action on a touch as a simple touch, a proximity touch, a contact touch, a double touch, a long touch, a multi-touch, a touch & drag, a touch flocking and the like.

In response to the focus adjustment command, the controller 180 is able to control the camera unit 121 to adjust a focus on the subject (S46). When the focus adjustment command is inputted, the controller 180 is able to control the adjustment of light intensity suitable for the subject as well as the focus adjustment. In this case, the adjustment of the light intensity can be performed in a manner that at least one of an iris of the camera unit and a shutter speed of the camera unit is adjusted.

After the focus adjustment command has been inputted, the controller 180 is able to control the camera unit 121 to generate the low-resolution images repeatedly in the first cycle using the image of the subject (S47). The low-resolution images after the focus adjustment command input can be generated in a manner of having the focus and light intensity for the subject more precise than those of the low-resolution images before the focus adjustment command input.

After the focus adjustment command has been inputted, the controller 180 is able to control the display unit 151 to display the generated low-resolution images as preview images for the photograph-taking of the subject (S48).

Subsequently, the user is able to input a photograph-taking command (S49). In this case, the photograph-taking command can be inputted in a manner that the user performs a shutter full-pressing on the shutter unit. Alternatively, in case that the display unit 151 includes a touchscreen, the photograph-taking command can be inputted in a manner that the user performs a touch gesture predefined for the photograph-taking on the touchscreen.

Subsequently, referring to FIG. 5 (5-1), in response to the photograph-taking command, the controller 180 controls the image signal processor 121-2 of the camera unit 121 to generate a corresponding high-resolution image using the image of the subject received via the lens unit (S50).

Due to the limited performance of the image signal processor 121-2 of the camera unit 121 provided to the mobile terminal 100, the high-resolution image can be generated after elapse of a predetermined time (ts) (e.g., 200 ms) from a timing point of the input of the photograph-taking command. In particular, the high-resolution image can include an image of the subject at the timing point of the elapse of the predetermined time (ts) from the photograph-taking command inputted timing point. In this case, the predetermined time (ts) can be set longer than the cycle (t1) for generating the low-resolution images repeatedly.

The controller 180 is able to control the generated high-resolution image to be stored as a photo file for the subject in the memory unit 160 (S51).

Referring to FIG. 5 (5-1), when the camera unit 121 generates the high-resolution image, the controller 180 is able to control the camera unit 121 not to generate the low-resolution image, by which the present embodiment is non-limited.

Referring to FIG. 5 (5-2), when the camera unit 121 generates the high-resolution image, the controller 180 is able to control the camera unit 121 to further generate the low-resolution image synchronized with the generated high-resolution image.

The controller 180 is able to control the low-resolution image, which is generated together with the high-resolution image, to be added to a header of the stored photo file. The low-resolution image added to the header is usable as thumbnail information for the stored photo file.

In the above description, the process for generating the high-resolution image after the input of the photograph-taking command is explained, by which the present embodiment is non-limited. On the contrary, the high-resolution image can be generated before the photograph-taking command is inputted. This is described in detail with reference to FIG. 6 and FIG. 7 as follows.

Figure 6:
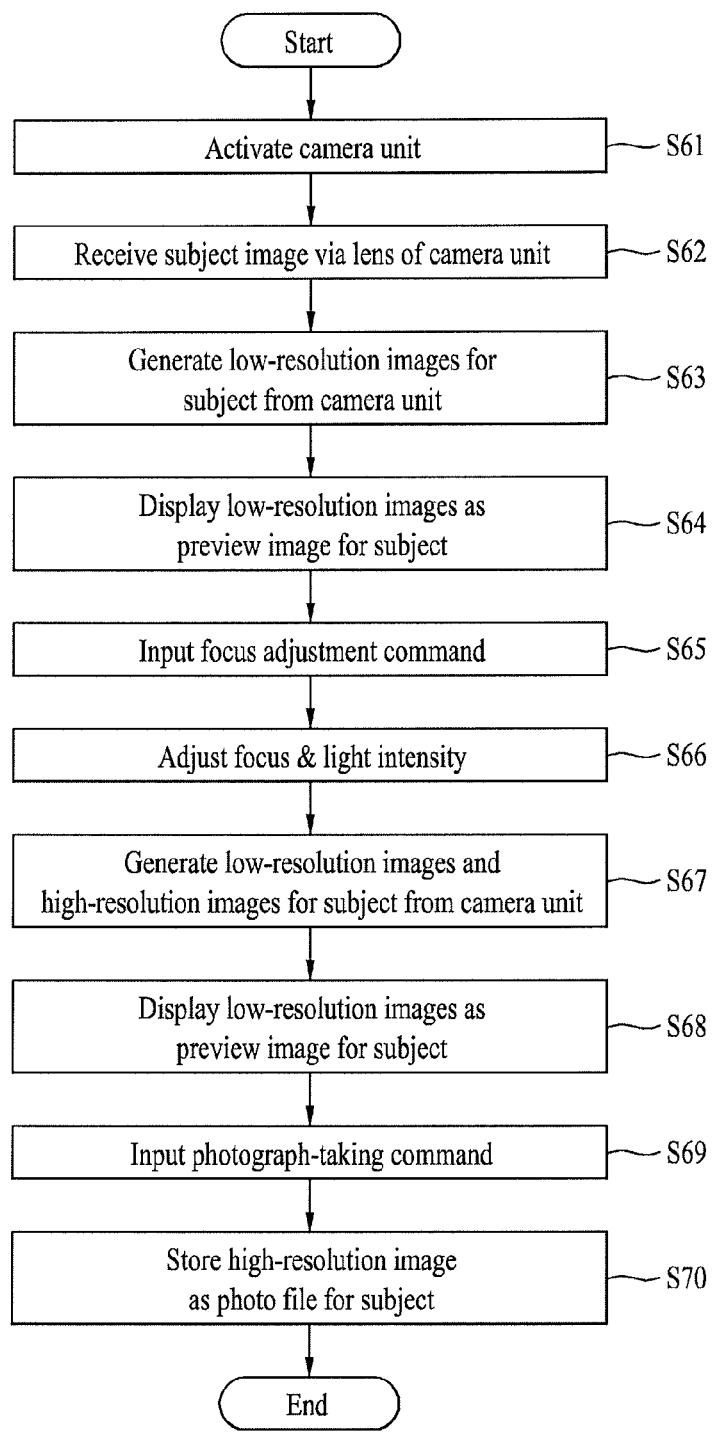
FIG. 6 is a flowchart for a method of controlling a mobile terminal according to an embodiment of the present invention.

FIG. 6 is a flowchart for a method of controlling a mobile terminal according to an embodiment of the present invention. And, FIG. 7 is a diagram of low-resolution and high-resolution image graphs for implementing a method of controlling a mobile terminal according to an embodiment of the present invention. The methods of FIGS. 6-7 may be performed by the devices of FIGS. 1-3.

First of all, steps S61 to S64 shown in FIG. 6 are substantially identical to the former steps S41 to 44 shown in FIG. 4. Accordingly, the descriptions for the steps S61 to S64 are omitted and the following description shall start with a step S65.

Referring to FIG. 6 and FIG. 7, while the low-resolution images are displayed as a preview image for the subject on the display unit, a focus adjustment command can be inputted by a user (S65). In response to the focus adjustment command, the controller 180 is able to control the camera unit 121 to adjust a focus on the subject (S66). As mentioned in the foregoing description, when the focus adjustment command is inputted, the controller 180 is able to control the adjustment of the light intensity on the subject together with the focus adjustment.

In response to the focus adjustment command, referring to FIG. 7 (7-1), the controller 180 is able to control the image signal processor 121-2 of the camera unit 121 to repeatedly generate the corresponding high-resolution images P1, P2, P3 . . . in a second cycle (t2) using the image of the subject received via the lens unit (S67).

Due to the limited performance of the image signal processor 121-2 of the camera unit 121, as mentioned in the foregoing description, an initial high-resolution image P1 among the repeatedly generated high-resolution images can be generated after an elapse of the predetermined time (ts) from a timing point of the input of the focus adjustment command After the initial high-resolution image P1 has been generated, the subsequent high-resolution images P2, P3 . . . can be repeatedly generated in the second cycle (t2).

And, referring to FIG. 7 (7-1), the controller 180 is able to control the corresponding low-resolution images to be further generated repeatedly in the second cycle in a manner of being synchronized with the generated high-resolution images (S67).

Since the low-resolution images shown in FIG. 7 are generated together with the high-resolution images, considering the limited performance of the image signal processor 121-2 of the camera unit 121, the low-resolution images shown in FIG. 7 can be generated in the second cycle (t2) (e.g., 66 ms) longer than the first cycle (t1) (e.g., 33 ms) in which the low-resolution images shown in FIG. 5 are generated. In particular, the high-resolution images shown in FIG. 7 can be generated in the second cycle (t2) longer than the first cycle (t1).

The generated low-resolution images can be displayed as a preview image for a photograph-taking of the subject on the display unit 151 (S68).

Thereafter, a user can input a photograph-taking command (S69).

If the photograph-taking command is inputted, the controller 180 is able to store the high-resolution image P5, which was generated right before the timing point of the input of the photograph-taking command, or the high-resolution image P6, which was generated right after the timing point of the input of the photograph-taking command, among the generated high-resolution images (or both of them) as photo file(s) of the subject in the memory unit 160 (S70).

In particular, which one (or whether both) of the two high-resolution images P5 and P6 right before and after the photograph-taking command input timing point will be stored as the photo files can be determined by a previous user's setting.

Alternatively, which one of the two high-resolution images P5 and P6 right before and after the photograph-taking command input timing point will be stored as the photo file can be determined in a manner of comparing a first time interval $t_A$ between the generated timing point of the high-resolution image P5 (which was generated right before the timing point of the input of the photograph-taking command) and the photograph-taking command inputted timing point to a second time interval $t_B$ between the generated timing point of the high-resolution image P6 (which was generated right after the timing point of the input of the photograph-taking command) and the photograph-taking command inputted timing point.

In particular, referring to FIG. 7 (7-2), if the first time interval $t_A$ is shorter than the second time interval $t_B$, the high-resolution image P5, which was generated right before the timing point of the input of the photograph-taking command, can be stored as the photo file of the subject. Alternatively, if the first time interval $t_A$ is longer than the second time interval $t_B$, the high-resolution image P6, which was generated right after the timing point of the input of the photograph-taking command, can be stored as the photo file of the subject.

Alternatively, as mentioned above, both of the high-resolution images P5 and P6 can be stored as the photo files of the subject. Alternatively, both of the high-resolution images P5 and P6 are synthesized into one image and the synthesized image can be stored as the photo file of the subject.

According to the above description, the high-resolution image right before and/or after the photograph-taking command inputted timing point is stored as the photo file of the subject, by which the present embodiment is non-limited. For instance, all or a portion of the high-resolution images generated after the focus adjustment command inputted timing point can be stored as photo files of the subject. This is explained in detail with reference to FIG. 8 and FIG. 9 as follows.

Figure 8:
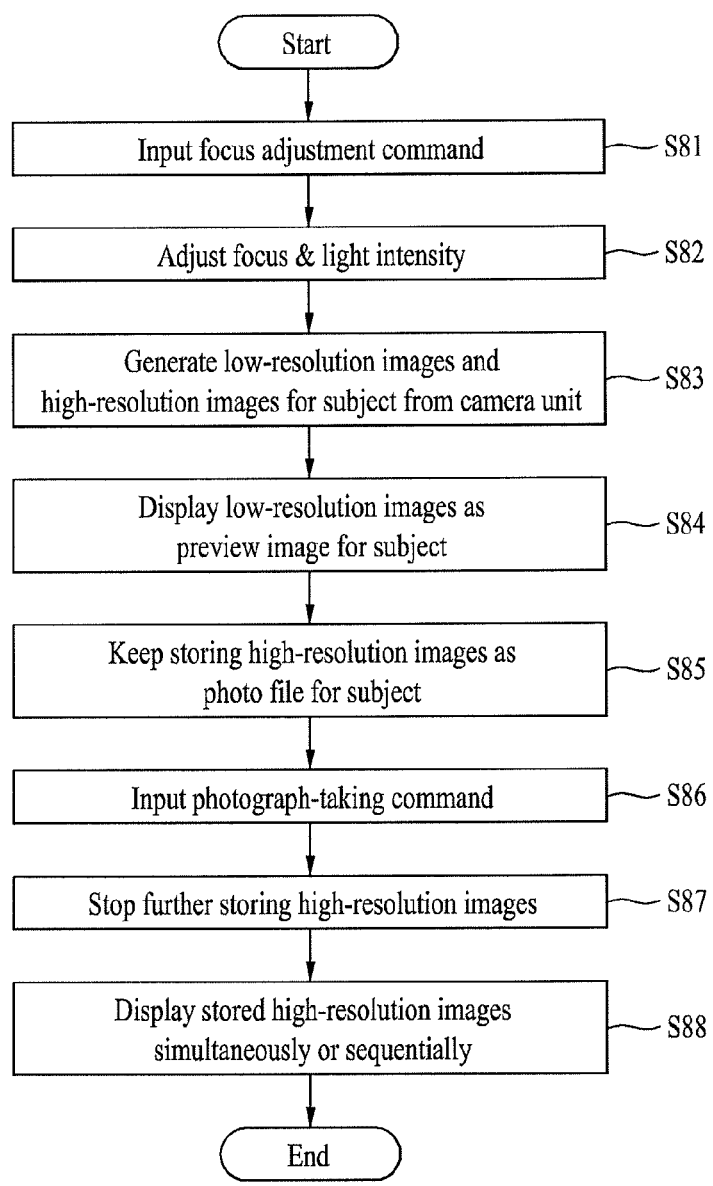
FIG. 8 is a flowchart for a method of controlling a mobile terminal according to an embodiment of the present invention.
Figure 9:
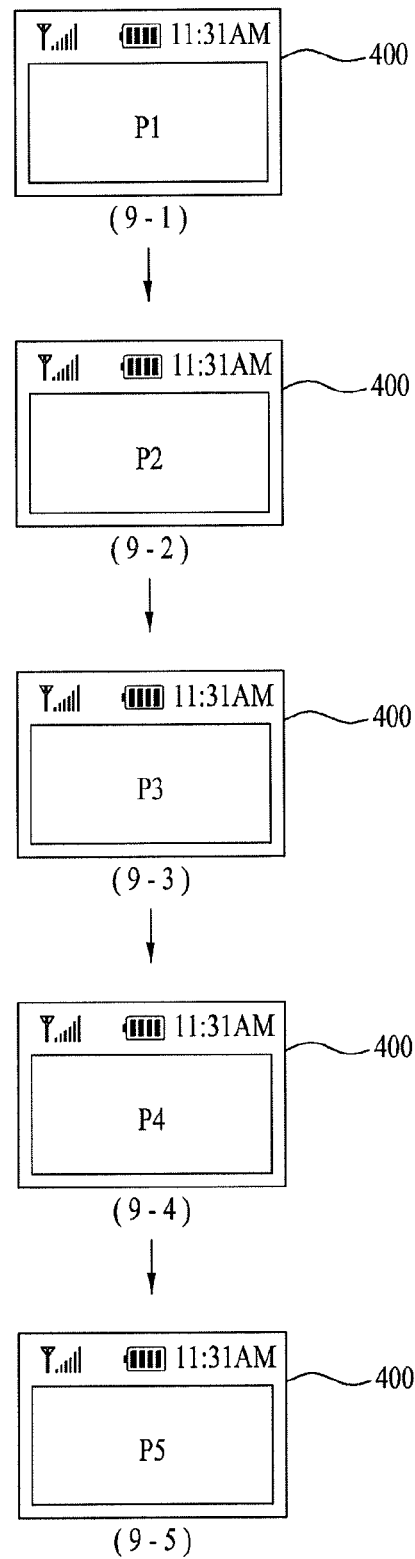

FIG. 8 is a flowchart for a method of controlling a mobile terminal according to an embodiment of the present invention. And, FIG. 9 is a diagram of display screen configurations for implementing a method of controlling a mobile terminal according to an embodiment of the present invention. The methods of FIGS. 8-9 may be performed by the devices of FIGS. 1-3.

In the following embodiment, the display module 151 can include a touchscreen. Yet, even if the display unit 151 does not include a touchscreen, it is understood that the following embodiments can be sufficiently implemented by a manipulation of the user input unit 140. And, a display screen of the touchscreen 151 shall be indicated by a reference number 400 in the following description.

Referring to FIG. 8 and FIG. 9, while the low-resolution images are displayed as a preview image for the subject on the display unit, a focus adjustment command can be inputted by a user (S81).

In response to the focus adjustment command, the controller 180 is able to control the camera unit 121 to adjust a focus on the subject (S82).

In response to the focus adjustment command, the controller 180 is able to control the corresponding high-resolution images to be repeatedly generated in a second cycle (t2) [S83].

And, the controller 180 is able to control the corresponding low-resolution images to be further generated repeatedly in a second cycle in a manner of being synchronized with the repeatedly generated high-resolution images (S83).

Moreover, the generated low-resolution images can be displayed as preview images for the photograph-taking of the subject on the display unit 151 (S84).

The above steps S81 to S84 can correspond to the former steps S65 to S68 shown in FIG. 6.

The controller 180 is able to control the repeatedly generated high-resolution images to be stored as photo files of one group for the subject in the memory unit 160 temporarily or permanently (S85). In this case that the high-resolution images are temporarily stored, it can mean a state that the high-resolution images are captured to be permanently stored in the future. The photo files of the group corresponding to the high-resolution images can be stored in the memory unit 160 in a manner of being discriminated from other photo files previously stored in the memory unit 160. In particular, an identifier, which indicates that the corresponding photo file belongs to the corresponding group, can be included in a header of each of the photo files corresponding to the high-resolution images.

Thereafter, a photograph-taking command can be inputted by a user (S86).

If the photograph-taking command is inputted, the controller 180 controls the storage of the high-resolution images to be completed (S87). That is, the storage of the high-resolution images continues until the photograph-taking command is inputted.

Meanwhile, referring to FIG. 7 (7-1), the controller is able to control the high-resolution images P1 to P5, which are repeatedly generated up to the timing point right before the input timing point of the photograph-taking command, to be stored. Alternatively, the controller is able to control the high-resolution images P1 to P6, which are repeatedly generated up to the timing point right after the input timing point of the photograph-taking command, to be stored. For clarity and convenience of the following description, assume that the high-resolution images P1 to P5, which are repeatedly generated up to the timing point right before the input timing point of the photograph-taking command, are stored.

After completion of the storage of the high-resolution images, the controller 180 is able to control the camera unit 121 to stop generating the high-resolution images repeatedly. As the repetitive generation of the high-resolution images is stopped, the controller 180 is able to control the camera unit 121 to stop the repetitive generation of the low-resolution images as well.

When the storage of the high-resolution images is completed, referring to FIG. 9 (9-1) to FIG. 9 (9-5), the controller 180 is able to control the stored high-resolution images P1 to P5 to be displayed on the touchscreen 400 sequentially and automatically. This enables a user to quickly review the stored high-resolution images P1 to P5 after the photograph-taking.

After the photograph-taking command has been inputted, the high-resolution images are temporarily stored. And, the high-resolution image(s) selected from the temporarily stored high-resolution images by a user can be stored as photo file(s) of the subject. This is explained in detail with reference to FIG. 10 as follows.

Figure 10:
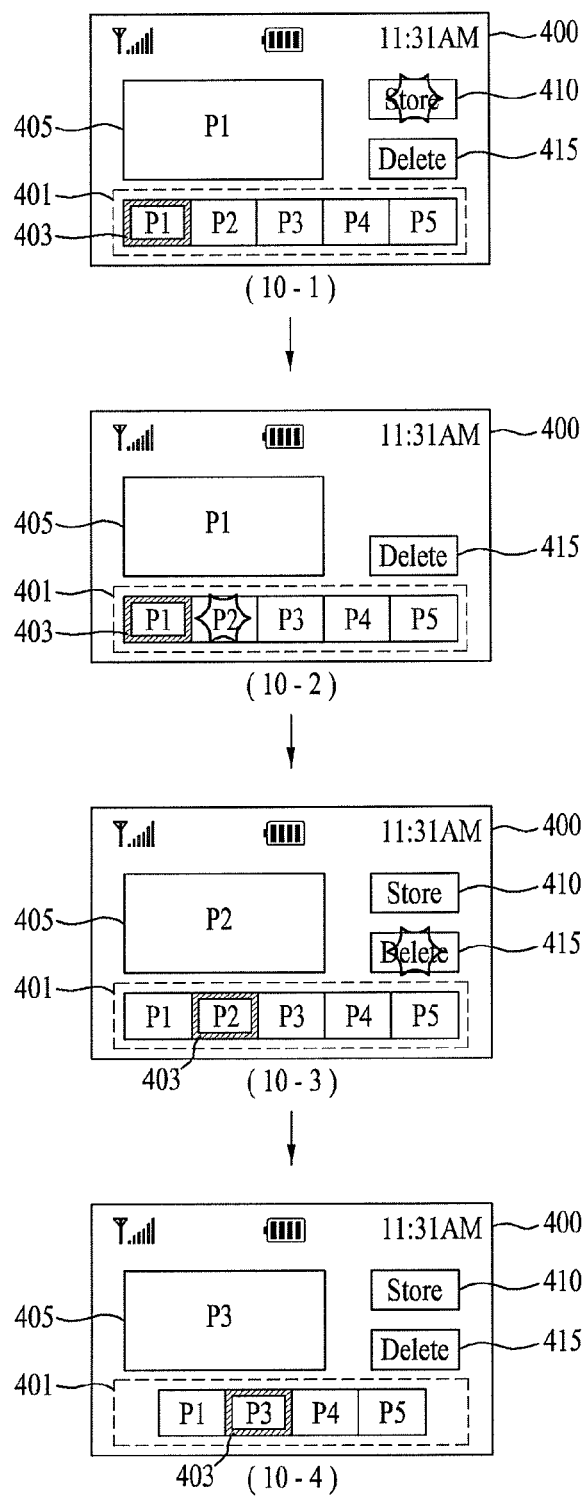

FIG. 10 is a diagram of display screen configurations for implementing a method of controlling a mobile terminal according to an embodiment of the present invention.

Referring to FIG. 10 (10-1), the controller 180 is able to control the temporarily stored high-resolution images P1 to P5 to be displayed in a row in one direction on a first region 401 of the touchscreen 400.

The controller 180 is able to control one image P1 among the displayed high-resolution images to be displayed as an enlarged image 405. In order to indicate that the enlarged image is the image P1, the image P1 among the high-resolution images displayed on the first region 401 can be visually discriminated the rest of the images. In FIG. 10 (10-1), exemplarily shown is that an indicator frame 403 is situated around the image P1 to visually discriminate the image P1 from the rest of the images P2 to P5.

The controller 180 is able to control the touchscreen 400 to display a store icon 410 for storing the image P1 corresponding to the enlarged image 405 and a delete icon 415 for deleting the image P1.

For instance, the store icon 410 can be touched and selected by a user.

If the store icon 410 is selected, the controller 180 is able to control the enlarged image, i.e., the temporarily stored image P1, to be permanently stored in response to the selection of the store icon 410.

As the image P1 is permanently stored, referring to FIG. 10 (10-2), when the image P1 is displayed as the enlarged image on the touchscreen 400, the controller 180 is able to control the store icon 410 not to be displayed on the touchscreen 400 (or to be displayed by being deactivated). This is because the store icon 410 is unnecessary for the image P1 due to the permanent storage of the image P1 corresponding to the enlarged image.

Thereafter, the image P2 can be touched and selected from the high-resolution images displayed on the first region 403 by the user.

If the image P2 is selected, referring to FIG. 10 (10-3), the controller 180 is able to control the image P2 to be displayed as the enlarged image 405 in response to the selection of the image P2.

As the image P2 is displayed as the enlarged image 405, the controller 180 is able to control the touchscreen 400 to display the store image 410 for storing the image P2 corresponding to the enlarged image 405 and the delete icon for deleting the image P2.

For instance, the delete icon 415 can be touched and selected by the user.

If the delete icon 415 is touched, the controller 180 is able to control the enlarged image, i.e., the temporarily stored image P2 to be deleted in response to the selection of the delete icon 415.

As the image P2 is deleted, referring to FIG. 10 (10-4), the controller 180 is able to control the image P2 not to be further displayed on the first region 401. And, the controller 180 is able to control the image P3 adjacent to the deleted image P2 to be automatically displayed as the enlarged image 405.

In the following description, utilization of the permanently stored high-resolution images is explained with reference to FIG. 11 in detail. For clarity and convenience of the following description, assume that the images P1 to P5 are permanently stored all.

Referring to FIG. 11, a photo album menu for displaying a list of the photo files stored in the memory unit 160 can be executed in the mobile terminal 100 through an appropriate manipulation of the user input unit 130.

Referring to FIG. 11 (11-1), thumbnails P1 to P5 of the photo files stored in the memory unit 160 can be displayed on the touchscreen 400.

Figure 15:
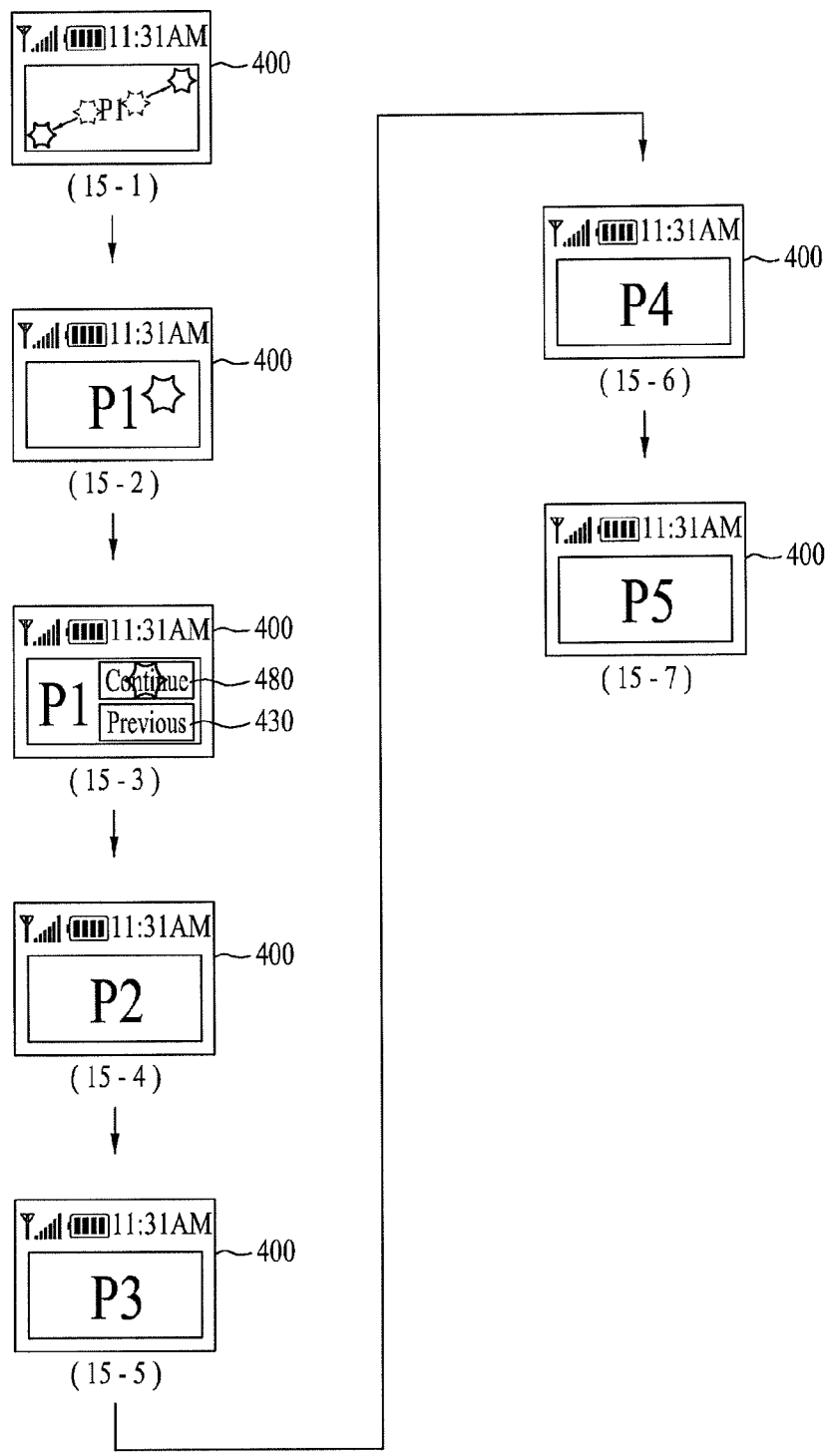

When the thumbnail P1 among the displayed thumbnails P1 to P5 is touched for example, the controller 180 is able to control the image P1 corresponding to the selected thumbnail P1 to be displayed or played on the touch screen (cf. FIG. 15 (15 1).

Yet, when the thumbnail P1 is double touched, the controller 180 is able to control the entire image of the group, to which the image P1 belongs, i.e., the images P1 to P5 to be sequentially displayed (cf. FIG. 9 (9-1) to FIG. 9 (9-5)). In order that the photo files corresponding to the image P1 to P5 belonging to the group among the photos stored in the memory 160 can be displayed identifiably and sequentially, it is able to use an identifier included in the header of each of the photo files to indicate that the corresponding photo file belongs to the group.

When the photo album menu is executed, referring to FIG. 11 (11-2), a folder 421 for the images P1 to P5 is displayed on the touchscreen 400. And, the thumbnails P1 to P5 can be situated within the folder 421. In particular, when the photograph-taking is completed, the controller 180 automatically generates the folder 421 and is then able to control the thumbnails P1 to P5 to be situated within the generated folder 421. As mentioned in the foregoing description with reference to FIG. 11 (11-1), the corresponding photo file(s) can be displayed in a manner of opening the generated folder 421 and then touching or double-touching a desired thumbnail.

When the photo album menu is executed, referring to FIG. 11 (11-3), an integrated thumbnail 423 for the photo files of the images P1 to P5 stored in the memory unit 160 can be displayed on the touchscreen 400. In particular, when the photograph-taking is completed, the controller 180 is able to control the integrated thumbnail 423 for the images P1 to P5 to be generated. In order for the integrated thumbnail 423 to be visually discriminated from other normal thumbnails, an integrated thumbnail indicator 425 can be displayed on the integrated thumbnail 423 for example. In particular, a first or last one of the images P1 to P5 can be previously set to become a thumbnail image displayed within the integrated thumbnail 423. And, it is a matter of course that the thumbnail image displayed within the integrated thumbnail 423 can be changed into a desired one of the images P1 to P5 in accordance with an appropriate manipulation of the user input unit 130.

When the integrated thumbnail 423 is touched, the controller 180 is able to control the images P1 to P5 corresponding to the integrated thumbnail 423 to be sequentially displayed (cf. FIG. 9 (9-1) to FIG. 9 (9-5)).

According to the above description, the images P1 to P5 can be sequentially displayed on the touchscreen 400, by which the present embodiment is non-limited. Instead of displaying the images P1 to P5 sequentially according to the description with reference to FIG. 11-1) to FIG. 11 (11-3), the images P1 to P5 can be simultaneously displayed. This is explained in detail with reference to FIGS. 12 to 14 as follows.

Figure 14:
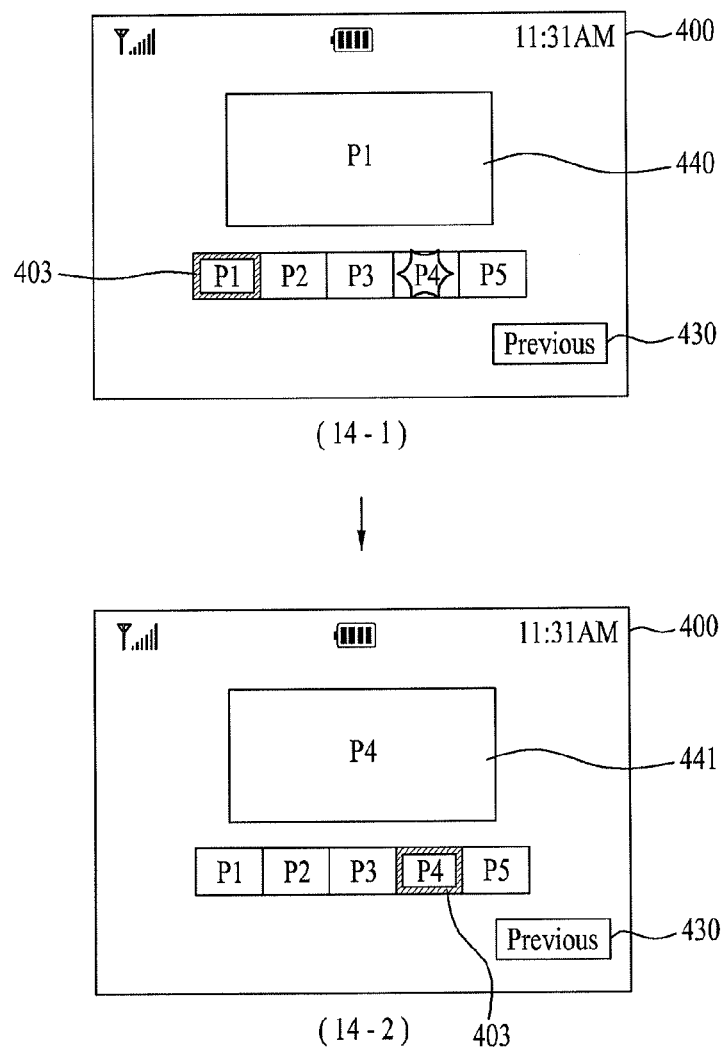

FIGS. 12 to 14 are diagrams of display screen configurations for implementing a method of controlling a mobile terminal according to an embodiment of the present invention.

For example, referring to FIG. 11 (11-1), as the photo album menu is executed in the mobile terminal 100, when the thumbnails P1 to P5 respectively corresponding to the images P1 to P5 are displayed on the touchscreen 400 in accordance with the execution of the photo album menu, the thumbnail P1 can be double touched among the displayed thumbnails P1 to P5.

If so, referring to FIG. 12 (12-1), the controller 180 is able to control the images P1 to P5 of the group, to which the image P1 belongs, to be simultaneously displayed in response to the double-touched thumbnail P1. While the images P1 to P5 are displayed, a 'previous' icon 430 for gong back to the photo album screen shown in FIG. 11 (11-1) can be displayed on the touchscreen 400 together with the displayed images P1 to P5.

Thereafter, the image P4 can be touched and selected from the simultaneously displayed images P1 to P5 for example.

If the image P4 is selected, referring to FIG. 12 (12-2), in response to the touched image P4, the controller 180 is able to control the image P4 to be enlarged and displayed on the touchscreen 400 only.

Alternatively, referring to FIG. 13 (13-1), in response to the double-touched thumbnail P1, the controller 180 controls the image P1 to P5 of the group, to which the image P1 belongs, to be simultaneously displayed and is also able to control a prescribed one (e.g., the image P1) of the images P1 to P5 to be displayed in a manner of being enlarged to become bigger than the rest of the images (e.g., the images P2 to P5) only. In particular, when the images P1 P5 are displayed in a first size, the image P1 can be displayed in a second size greater than the first size.

Since the thumbnail P1 is double touched while the thumbnails P1 to P5 are displayed in shown in FIG. 11 (11-1), the image P1 can be enlarged and displayed. Alternatively, even if any one of the thumbnails P1 to P5 is double touched, a preset image (e.g., the image P1 that is the first one of the images) among the images can be displayed in a manner of being enlarged.

Meanwhile, the image P4 can be touched and selected from the simultaneously displayed images P1 to P5.

If so, referring to FIG. 13 (13-2), in response to the touched image P4, the controller 180 controls the images P1 to P3 and P5 to be displayed in the first size and is also able to display the image P4 to be displayed in the second size in a manner of being enlarged.

Alternatively, in response to the double-touched thumbnail P1 while the thumbnails P1 to P5 are displayed in shown in FIG. 11 (11-1), the controller 180, referring to FIG. 14 (14-1), controls the image P1 to P5 of the group, to which the image P1 belongs, to be simultaneously displayed and is also able to control a prescribed one (e.g., the image P1) of the simultaneously displayed images P1 to P5 to be separately displayed as an enlarged image 440. In FIG. 14 (14-1), exemplarily shown is that the image P1 is displayed as the enlarged image 440 in a manner that an indicator frame 403 is situated around the image P1.

Since the thumbnail P1 is double touched while the thumbnails P1 to P5 are displayed in shown in FIG. 11 (11-1), the image P1 can be displayed as the enlarged image 440. Alternatively, even if any one of the thumbnails P1 to P5 is double touched, a preset image (e.g., the image P1 that is the first one of the images) among the images can be displayed as the enlarged image 440.

Meanwhile, the image P4 can be touched and selected from the simultaneously displayed images P1 to P5.

If so, referring to FIG. 14 (14-2), in response to the touched image P4, the controller 180 controls the image P4 among the images P1 to P5 to be displayed as the enlarged image 440. In FIG. 14 (14-2), exemplarily shown is that the image P1 is displayed as the enlarged image 440 in a manner that an indicator frame 403 is situated around the image P4.

The following description is explained with reference to FIG. 15.

FIG. 15 is a diagram of display screen configurations for implementing a method of controlling a mobile terminal according to an embodiment of the present invention.

Referring to FIG. 15, as mentioned in the foregoing description with reference to FIG. 11 (11-1), as the photo album menu is executed in the mobile terminal 100, the thumbnail P1 can be touched among the thumbnails P1 to P5 displayed on the touchscreen 400.

If so, referring to FIG. 15 (15-1), the controller 180 is able to control the image P1 corresponding to the selected thumbnail P1 to be displayed on the touchscreen 400.

Thereafter, a user can input a zoom-in command for zooming in the image P1 on a specific zoom level. In doing so, the zoom-in command can be inputted through an appropriate manipulation of the user input unit 130. For instance, the zoom-in command can be inputted in a manner of touching two points on the image P1 displayed on the touchscreen 400 simultaneously with two fingers and then dragging the two fingers in a pinching-out direction.

If the zoom-in command is inputted, referring to FIG. 15 (15-2), the controller 180 is able to control the image P1 to be displayed by zoom-in in response to the zoom-in command.

Thereafter, the user is able to input a continuation command for displaying all images of the group, to which the image P1 belongs, contiguously. In this case, continuation command can be inputted by an appropriate manipulation of the user input unit 130. For instance, referring to FIG. 15 (15-2), if the image P1 on the touchscreen is touched, a continuation icon 480 for the continuation command can be displayed on the touchscreen 400. In this case, the continuation icon 480 is displayed on the image P1 or can be displayed outside the image P1. Referring to FIG. 15 (15-3), as the continuation icon 480 is touched and selected; the continuation command can be inputted.

Therefore, referring to FIG. 15 (15-3) to FIG. 15 (15-7), the controller 180 is able to control the entire images of the group, to which the image P1 belongs, i.e., the images P1 to P5, to be contiguously displayed in a manner of being zoomed in on in accordance with the specific zoom level.

Accordingly, the present invention provides the following effects and/or advantages.

First of all, according to at least one of embodiments of the present invention, the present invention minimizes a time difference between a photograph-taking command inputted timing point and a timing point of actually taking a photo during a photograph-taking, thereby enabling a terminal user to have an advantage of photographing an image for a subject at a desired timing point.

Secondly, according to at least one of embodiments of the present invention, the present invention enables a plurality of photos of a specific group to be simultaneously stored by a single photograph-taking command during performing a photograph-taking. And, the present invention enables a plurality of images of the group to be collectively played in a manner of being automatically discriminated from other previously-stored image.

It will be apparent to those skilled in the art that various modifications and variations can be specified into other forms without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like. And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a memory;
a display;
a camera; and
a controller configured to:
receive a focus adjustment command at a first timing point,
repeatedly receive low-resolution images and high-resolution images of a subject from the camera after the focus adjustment command is received, wherein only the low-resolution images are being repeatedly received in a first cycle before the focus adjustment command is received, and both the low-resolution images and the high-resolution images are being repeatedly received synchronously with each other in a same second cycle longer than the first cycle after the focus adjustment command is received, so that each of the low-resolution images is synchronously generated at a same time as each of the high-resolution images is generated,
display one of the low-resolution images as a preview image of the subject on the display, receive a photograph taking command at a second timing point after the first timing point, and store in the memory more than one of the high-resolution images repeatedly received prior to the second timing point as a photo file of the subject when the photograph-taking command is received, wherein the second cycle is set shorter than a time interval between the first timing point and a third timing point corresponding to when the high-resolution images are initially and synchronously received at the same time as the low-resolution images are generated.

2. The mobile terminal of claim 1, wherein at least one of the high-resolution images stored as the photo file is a high resolution image received immediately before the second timing point.

3. The mobile terminal of claim 2, wherein the focus adjustment command is configured to control the camera to adjust a focus and a light intensity of the subject.

4. The mobile terminal of claim 2, wherein the controller is configured to add, as thumbnail image information, one of the low-resolution images corresponding to at least one of the high-resolution images stored as the photo file.

5. The mobile terminal of claim 1, wherein the display includes a touch screen for receiving touch commands, wherein the received touch commands are manually input touch commands for the focus adjustment command and the photograph-taking command.

6. The mobile terminal of claim 1, wherein the low-resolution images are generated in a YUV format, and wherein the high-resolution images are generated in a JPEG (joint photographic experts group) format.

7. The mobile terminal of claim 1, wherein the controller is configured to store at least two of the high-resolution images among the high-resolution images as a group of photo files in the memory in response to the photograph-taking command.

8. The mobile terminal of claim 7, wherein the controller is configured to automatically and sequentially display the at least two stored high-resolution images on the display after the photograph-taking command has been received.

9. The mobile terminal of claim 7, wherein the group of photo files comprises a still picture file.

10. The mobile terminal of claim 7, wherein, in response to a selection command, the controller is configured to select the at least two stored high-resolution images from among the received high-resolution images.

11. The mobile terminal of claim 7, wherein, when a play command for one of the photo files of the group is inputted while the one of the photo files of the group is displayed, the controller is configured to simultaneously or sequentially play all of the photo files of the group.

12. The mobile terminal of claim 11, wherein, if the one of the photo files of the group is displayed at a specific zoom level, the controller is configured to sequentially play all of the photo files of the group at the specific zoom level.

13. The mobile terminal of claim 1, wherein the controller is further configured to:

receive a camera activation command for activating the camera on the mobile terminal, and receive only the low-resolution images in the first cycle between the camera activation command and the focus adjusting command.

14. A method of controlling a mobile terminal, the method comprising:

receiving an image of a subject via a camera of the mobile terminal;

receiving a focus adjustment command at a first timing point;

repeatedly generating, by the mobile terminal, low-resolution images and high-resolution images after the focus adjustment command is received, wherein only the low-resolution images are being repeatedly generated in a first cycle before the focus adjustment command is received, and both the low-resolution images and the high-resolution images are being repeatedly received synchronously with each other in a same second cycle longer than the first cycle after the focus adjustment command is received, so that each of the low-resolution images is synchronously generated at a same time as each of the high-resolution images is generated;

displaying one of the low-resolution images as a preview image of the subject on a display of the mobile terminal;

receiving a photograph taking command at a second timing point after the first timing point; and storing, in a memory of the mobile terminal, more than one of the high-resolution images generated prior to the second timing point as a photo file of the subject when the photograph-taking command is received, wherein the second cycle is set shorter than a time interval between the first timing point and a third timing point corresponding to when the high-resolution images are initially and synchronously received at the same time as the low-resolution images are generated.

15. The method of claim 14, further comprising adjusting a focus and a light intensity of the subject in response to receiving the focus adjustment command.

16. The method of claim 14, wherein at least one of the high-resolution images stored as the photo file is a high resolution image generated immediately before the second timing point.

17. The method of claim 14, further comprising:

adding, as thumbnail image information, one of the low-resolution images corresponding to at least one of the high-resolution images stored as the photo file.

* * * * *